Nov. 15, 1932.  G. B. SIPE  1,887,895
COMBINED DRILL AND UNDERREAMER
Filed Sept. 6, 1930  2 Sheets-Sheet 1

INVENTOR.
George B Sipe
BY Lancaster, Allwine and Rommel
ATTORNEYS.

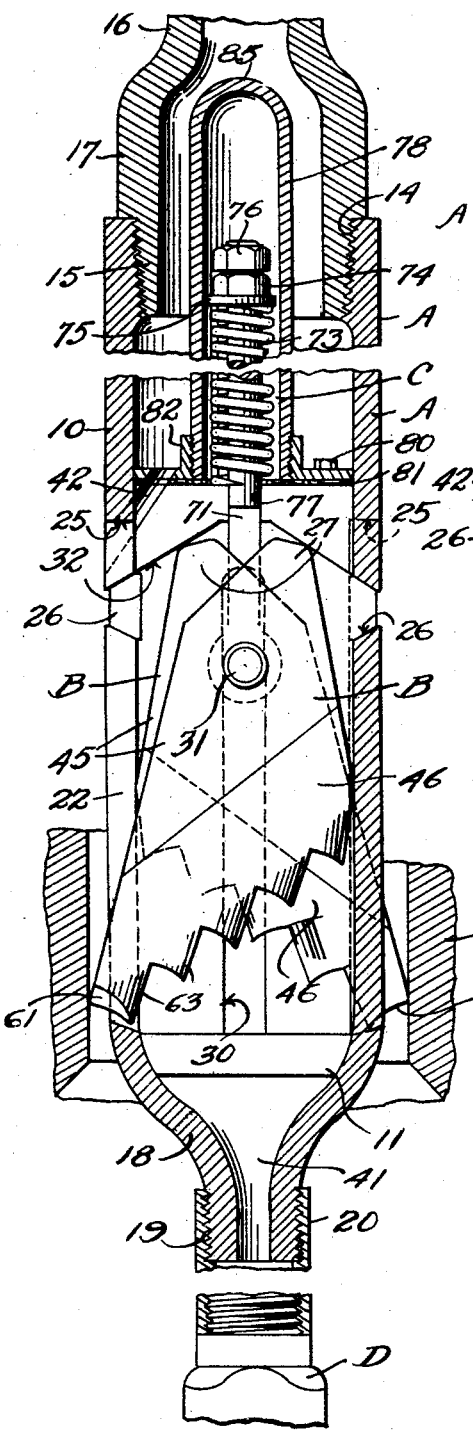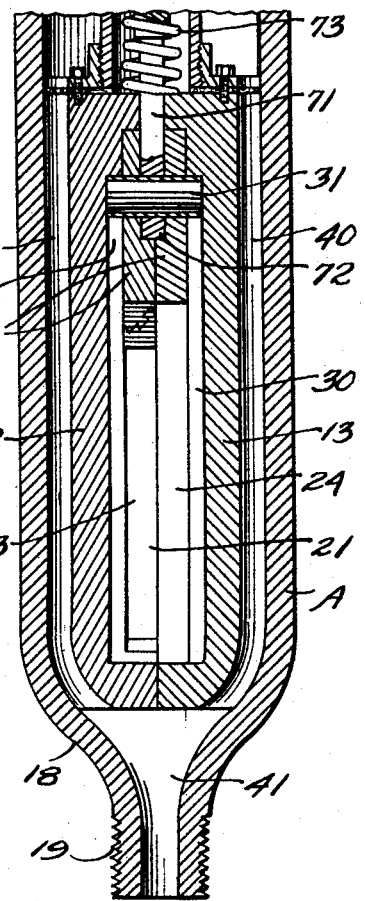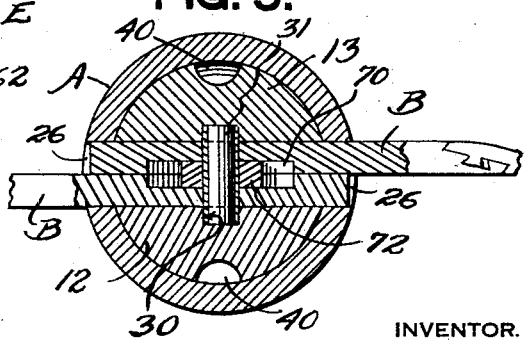

Patented Nov. 15, 1932

1,887,895

UNITED STATES PATENT OFFICE

GEORGE B. SIPE, OF SHREVEPORT, LOUISIANA

COMBINED DRILL AND UNDERREAMER

Application filed September 6, 1930. Serial No. 480,259.

The present invention relates to rotary collapsible drills and underreamers and more particularly to improvements over what is disclosed in Patent 1,647,670 granted to me November 1, 1927.

The equipment may be used in the sinking of shafts or drilling of holes of exceptionally large diameter, as is that disclosed in my said patent, and is particularly well adapted for use in enlarging the cavity beneath the surface or providing enlargements in the cavity at various places beneath the earth's surface. In this connection the invention may be said to serve very effectively to provide enlargements of extraordinary diameter at each or selected water sand stratum of wells, for the purpose of facilitating the utilization of the gravel wall method to increase the yield of the well.

The principal objects of the invention are to provide a collapsible drill and underreamer which is positive in its action both as to the extending of the blades when their use is desired and the retraction or collapsing of the blades when it is desired to withdraw the equipment from the well, regardless of the size of the hole thru which the drill is let down for operation and removed for repair or upon completion of the job; to provide a rotary collapsible drill and underreamer wherein the blades are projected laterally from the main body or carrier portion and act as very efficient cutting mediums as soon as they are projected to a slight degree which effectiveness continues through their lateral movement as well as when fully projected; and to provide a rotary collapsible drill and underreamer wherein the laterally movable blades are effectively supported for cutting purposes even tho projected to a slight extent from the main body portion or carrier and are, when fully extended, supported by said main body or carrier at least at diametrically opposite portions of the main body or carrier, thus permitting the use of relatively long blades, capable of cutting cavities of extraordinary diameter open to the hole thru which the tool is placed and removed.

Another object of the invention is to provide a collapsible drill and underreamer the main body portion of which is so made and the reaming blades so positioned that the main body portion may carry, as by a detachable connection, a pilot or drill head, of any approved construction, below the reaming blades thus permitting the tool to be used in test holes or wells which extend below the place where an enlarged cavity open to the hole is to be made.

Other objects and advantages of the invention will appear in the following detailed description of the preferred embodiment of the invention, taken in connection with the accompanying drawings, forming a part of this specification, and in which drawings:

Figure 2 is a view similar to Figure 1, but showing the underreaming blades collapsed.

Figure 3 is a partial side elevation, on a reduced scale, of the device.

Figure 4 is a partial sectional view on the line 4—4 of Figure 1.

Figure 5 is a fragmentary sectional view on the line 5—5 of Figure 1.

Figure 6 is a plan view looking in the direction of the arrow, Figure 1, of one of the blades.

Figure 7 is a sectional view thru fragments of the blade and carrier body, the parts being separated to disclose details.

Figure 8 is an enlarged plan view of a portion of these elements showing approved means for connecting the same.

Figure 1:
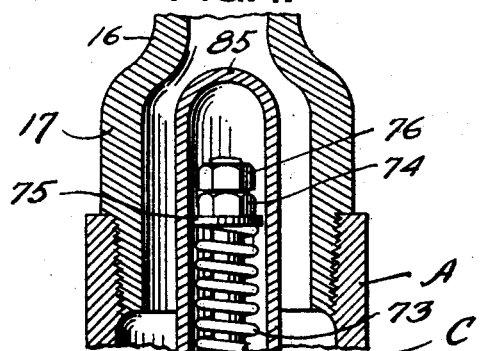
Figure 1 is a view partly in central vertical section and partly in elevation of a collapsible drill and underreamer constructed according to my invention, a portion of the pilot end being broken away and removed.
Figure 1:
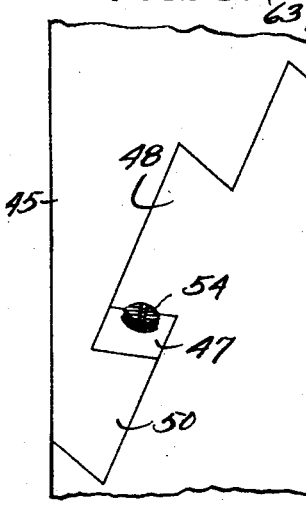
Figure 1:
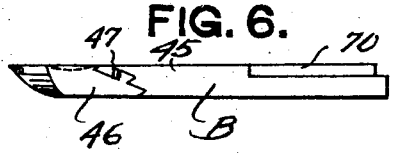
Figure 1:
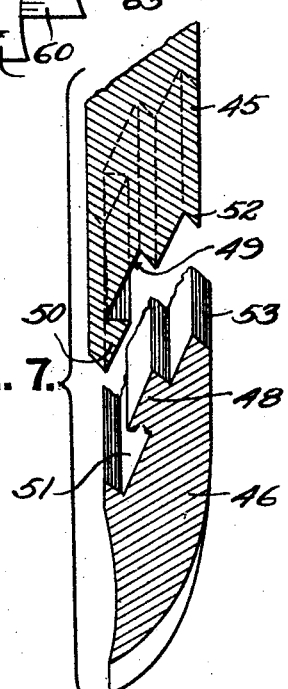

In the drawings, wherein for the purpose of illustration only a preferred embodiment of the invention is shown, A designates the main body portion or supporting holder; B companion bit blades movably and collapsibly supported thereby; C means normally urging the blades B into laterally extending relation from the holder as shown in Figure 1; and D a pilot or drill head carried by the lower portion of the holder A. At E, Figure 2, is shown a well casing thru which the drill may be moved with the blades in a collapsed position, but it is to be understood that this is merely by way of example, since a well casing is not absolutely necessary. The blades may be held in collapsed position by any suitable means, such as the walls of the well test hole, or by frangible or other means acting as a temporary girth about the body A, at the blades B.

The supporting holder A preferably comprises a hollow cylindrical-shaped barrel portion 10, and a body plug 11 which, in the example shown comprises complementary semi-cylindrical-shaped sections 12 and 13. The upper end portion of the barrel 10 may be internally screw threaded as at 14 for the reception of the externally threaded portion 15 of a drill stem 16 which, in the example shown, has an enlarged lower portion 17 for a purpose to be subsequently set forth. The body plug 14 may be held in the barrel 10, intermediate the ends of the latter, by a constricted lower portion 18 of the barrel having screw threads 19 for the reception of a collar 20 or other suitable means whereby the pilot or drill head D, or any suitable device may be connected to the lower end of barrel 10.

In order to provide a transverse passageway 21 in the supporting holder A for the accommodation of the bit blades B, the barrel 10 is provided with diametrically opposite slots 22 which communicate with cavities 23 and 24 in the sections 12 and 13, respectively, of the body plug 11, these cavities 23 and 24 being in confronting relation as shown in Figure 4. The slots 22 are each relatively long and at their upper portions are provided with abutment walls 25 against which the blades B engage, when extended, as shown in Figure 1 and the slots are also provided with laterally opening pockets 26 for reception of the inner end portions 27 of the blades B, when the blades are in extended positions.

The sections 12 and 13 may be identical so that it suffices to describe one in detail. At the bottom of the cavity, a part of the transverse passageway 21 is provided a longitudinally extending groove 30 for the reception of a projection 31, such as a pin carried by the blades B. In order to make these sections interchangeable, to each side of the longitudinal axis of groove 30 is provided a slide face 32 for engagement with the inner end portion 27 of the blade B as hereinafter described. These slide faces are in planes intersecting the axis of the grooves 30, so that when the pin 31 is drawn upwardly from the position shown in Figure 2, the end portions 27 of the blades will ride on these slide faces to the pockets 26, as shown in Figure 1. In the example shown, the slide faces 32 are in downwardly diverging relation but such is not essential since the function of the slide face is to provide an abutment for the inner end of the blade offset with respect to the axis of the slot 30 in which the guide pin 31 moves.

Exteriorly, the sections 12 and 13 may be provided with longitudinally extending grooves or waterways 40, whereby water may be delivered thru a passageway 41 in the lower constricted portion 18 of the barrel 10 and for delivery of water if desired at the head D. It is to be observed that in this form of collapsible drill, the barrel 10 also acts as a wall for the waterways 40, in a manner similar to the arrangement disclosed in my aforesaid Patent 1,647,670. Other waterways 42 may be provided for the delivery of water adjacent the blades B when they are in an extended position. As shown in Figures 2 and 3, these waterways 42 lead diagonally downwardly and outwardly opening at a point adjacent the upper portions of the blades, but it is to be understood that other arrangements may be provided for the delivery of water to facilitate the drilling operation.

Each bit blade B comprises a carrier 45, and cutter 46, the latter being held to the former in any suitable manner, such as by the use of key 47. In the example shown, the cutter 46 is provided with a dove-tail 48 for reception in a slot 49 of corresponding shape formed in the carrier 45 and the carrier provided with a dove-tail 50 fitting a correspondingly shaped slot 51 in the cutter. If desired, the carrier may also be provided with a flange 52 engaging a beveled surface 53 along the upper marginal portion of the cutter. When the parts 45 and 46 are in assembled relation, that is, with the dove-tails 48 and 50 in their respective slots 49 and 51, respectively, the wedge key 47 may be driven into place and held in any suitable manner, such as by a set screw 54 having screw threaded engagement with the dove-tail 48 and the key. It is to be understood that upon driving the tapered key 47 into place, the cutter 46 is gradually and firmly forced into proper position with respect to the carrier and so that the forces coming upon the cutter, incident to operation of the drill will be transmitted to the holder A in the proper manner. In the example shown, the cutter 46 is provided with stepped blade portions 60 each of which may be similar to the blade portion of a fish-tail bit, and the uppermost of these is beveled as at 61 so as to provide a cutting edge 62 in addition to the cutting edges 63 at the lower margins of the blade portions 60. According to this construction, as may be observed from Figure 2, the drill is ready for operation immediately upon the cutter engaging material and upon rotation being imparted to the tool. It is to be distinctly understood, however, that these characteristics of the cutters are merely by way of example and that the cutters may be given different formations according to the nature of the material encountered and to be removed. The key arrangement provides a simple and firm connection between the parts 45 and 46 and of course permits the removal and replacing of the cutters as for resharpening or repair.

The bit blades B, as shown in the drawings, are particularly well adapted for underreaming in a manner that the top wall of the cavity formed by the blades is in a plane at a right angle to the axis of the hole, since when the blades are fully extended as shown in Figure 1, the straight top edges of the blades are at right angles to the axis of the body A. Also the blade portions 60 extending from the extremity of each blade to the bit body A in downwardly and inwardly stepped relation along a general line in diverging relation to said straight edge facilitates drilling, since there is not presented a continuous cutting edge in straight line formation, but a plurality of spaced cutting edges 63 with a pronounced laterally disposed substantially vertical cutting edge 62 at the extremity of each blade which effectively cuts or disrupts the material encountered.

The confronting faces of the blades B are recessed as at 70, at their inner ends 27, for the reception of the lower end portion of a supporting rod 71 which is provided with an eye 72 encircling the pin 31. This supporting rod 71 forms a part of the means C, and which is similar to that shown in my aforesaid Patent 1,647,670 normally urging the blades into laterally extending relation from the holder. This means C also includes an expansion spring 73 encircling the rod 71, and a nut 74 for adjusting the action of spring 73. In the example shown, a washer 75 is interposed between the nut 74 and the upper end portion of spring 73, a lock nut 76 also being shown to prevent accidental rotation of nut 74. The lower end portion of spring 73 abuts against the upper face of sections 12 and 13 of the body plug 11, which sections are provided with recesses 77 for the accommodation of the supporting rod 71. In order to permit efficient operation of the spring 73, it is desirable to seal the same from water contact. This is accomplished by enclosing it in a housing 78. A base collar 79 is bolted upon the top surface of the sections 12 and 13, as by bolts 80, with a gasket 81 between the same and the body plug 11. The base collar 79 includes an internally screw threaded sleeve 82 within which the lower screw threaded end of the housing 78 extends, with its lower end in abutment with the gasket 81. The upper end of the housing 78 is provided with a detachable dome-like portion 85 which may be removed in order to gain access to the nuts 74 and 76. The enlarged portion 17 of the drill stem 10 is provided to accommodate the upper end portion of the housing. This means for excluding water from the spring compartment is very similar to that shown in the aforesaid Patent 1,647,670 and is merely by way of example, it being understood that other arrangements may be provided whereby the spring and associated parts may be isolated from the water passageways.

The operation of the collapsible drill and underreamer for the provision of holes or shafts of exceptionally large diameters is perhaps self-evident from an inspection of the drawings and a consideration of the aforesaid patent granted to me November 1, 1927. It is desired to point out, however, and to distinguish the present invention from certain of the characters shown in the aforesaid patent that this device may be used to provide enlargements of extraordinary diameter at each or selected water sand stratum of wells for the purpose of facilitating the use of the gravel wall method to increase the yield of the well, and that these enlargements may well communicate with the hole initially drilled. In practice this hole may be of twelve, sixteen, or twenty inches in diameter, by way of example, and in these drilling operations, where it is desired to make the enlargements at the water sand stratum it may not be desirable to have collapsible drills of different sizes. According to the present invention a collapsible drill having a holder A of a size to be let down in a hole of minimum diameter, such as twelve inch diameter, may also be used in holes of larger diameter without danger of the drill failing to collapse when withdrawn from the hole, since the present arrangement, utilizing but one projection for each blade in its companion slot 30, and having the inner end of the blade engaging the slide face causes the blades to collapse to a position substantially as shown in Figure 2, no matter whether the upper marginal portions of the blades engage the upper wall of the cavity near the holder A, or remote therefrom. As an example, using the dimensions hereinbefore given, merely by way of example, if the collapsible drill having been used for enlargement of a cavity open to a well hole of twenty inches diameter were to be removed, and if the holder were of a diameter for use in a hole having a minimum diameter of twelve inches, it is obvious that the end portions of the blades remote from the holder A would be engaged by the casing E or other abutment rather than portions of the blades closely adjacent the holder. However, since the point of engagement is above the axis of pin 31 collapsing of the blades is assured.

It is also to be observed from Figure 2 that as soon as the blades B are released to move outwardly responsive to action of spring 73, cutting edges will be provided for engagement with the material to be cut away and thus there is cutting, in contradistinction to grinding, as soon as circumferential movement is imparted to the holder.

The pilot or drill head B may be utilized to hold the rotary drill co-axial with the hole in which it is disposed, while underreaming or cutting away a cavity intermediate the opening and bottom of a test hole or well. Different types of tools may be secured to the lower end of holder A, or the lower end may be plugged if it is desired to prevent the escape of water thru the passageway 41.

Various changes in the shape, size and arrangement of parts may be made to the form of invention herein shown and described, without departing from the spirit of the invention or the scope of the following claims.

I claim:

1. In a collapsible drill, the combination of a holder provided with a groove and a slide face therein, and a collapsible bit blade movably connected with said holder, including a projection operating in said groove, said blade having its one end portion riding in engagement with said slide face to guide the blade into extended and collapsed positions.

2. In a collapsible drill, the combination of a holder provided with a groove and a slide face therein, a collapsible bit blade movably connected with said holder, including a projection operating in said groove, said blade having its one end portion riding in engagement with said slide face to guide the blade into extended and collapsed positions, and means normally urging the blade into laterally extending relation from the holder.

3. In a collapsible drill, the combination of an elongated supporting body provided with a longitudinally extending groove therein, and a slide face to one side of the axis of said groove, and a collapsible bit blade movably connected with said holder, including a projection operating in said groove, said blade having its one end portion riding in engagement with said slide face to guide the blade into extended and collapsed positions.

4. In a collapsible drill, the combination of an elongate supporting holder provided with a longitudinally extending groove therein, and a slide face to one side of the axis of said groove, a collapsible bit blade movably connected with said holder, including a projection operating in said groove, said blade having its one end portion riding in engagement with said slide face to guide the blade into extended and collapsed positions, and means normally urging the blade into laterally extending relation from the holder.

5. In a collapsible drill, the combination of an elongate supporting holder provided with a longitudinally extending groove therein and a slide face to one side of the axis of said groove and in a plane intersecting said axis, a collapsible bit blade movably carried by said holder, including a projection operating in said groove, said blade having its inner end portion riding in engagement with said slide face, and means acting in a line parallel to the axis of said groove to normally but yieldably urge said blade into laterally extending relation from the holder.

6. In a collapsible drill, the combination of an elongate hollow supporting holder provided with elongated slots at opposite sides of the holder longitudinally thereof, said slots each having a pocket opening laterally thereto and to the interior of the holder, and a pair of collapsible bit blades pivotally and slidably carried by the holder to swing outwardly and upwardly in opposite directions from the holder thru said slots, and when in an outwardly extending operative position each having its upper margin engaging the upper wall of the slot thru which it extends and its inner end portion in the pocket of the slot from which its companion blade extends, and engaging the bottom wall of said pocket.

7. In a collapsible drill, the combination of an elongate holder, and a pair of blades pivotally carried by said holder to swing outwardly and upwardly in opposite directions from the holder, said blades each provided with a substantially straight edge and blade portions provided with cutting edges extending from the extremity of the blades in stepped relation along a general line in diverging relation to said straight edge, said blades limited in their movement when extended so that their said straight edges are in right angular relation to the axis of the drill holder, and said blade portions with cutting edges in stepped relation downwardly and inwardly from the extremities of the blades toward the drill holder.

GEORGE B. SIPE.